(12) United States Patent
Kumar

(10) Patent No.: US 7,027,735 B2
(45) Date of Patent: Apr. 11, 2006

(54) UNEQUAL PULSE SPACER

(75) Inventor: Shiva Kumar, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 879 days.

(21) Appl. No.: 10/115,699

(22) Filed: Apr. 3, 2002

(65) Prior Publication Data

US 2004/0208623 A1 Oct. 21, 2004

(51) Int. Cl.
*H04J 14/02* (2006.01)

(52) U.S. Cl. .......................... 398/102; 398/53; 398/81; 398/161

(58) Field of Classification Search .................. 398/53, 398/81, 102, 161
See application file for complete search history.

(56) References Cited

U.S. PATENT DOCUMENTS

| | | | |
|---|---|---|---|
| 3,862,373 A | 1/1975 | Cohen et al. ................. | 179/15 |
| 4,346,315 A | 8/1982 | Roberts ....................... | 307/603 |
| 5,063,559 A | 11/1991 | Marcuse ...................... | 359/127 |
| 5,151,698 A | 9/1992 | Pophillat .................... | 341/52 |
| 5,535,032 A | 7/1996 | Bottle ......................... | 359/140 |
| 5,677,786 A * | 10/1997 | Meli ........................ | 359/341.1 |
| 6,118,563 A | 9/2000 | Boskovic et al. ........... | 359/124 |
| 6,163,638 A | 12/2000 | Eggleton et al. ............... | 385/37 |
| 6,243,181 B1 | 6/2001 | Golovchenko et al. ...... | 359/161 |
| 6,549,697 B1 * | 4/2003 | Bigo et al. .................... | 385/24 |
| 2001/0053007 A1 | 12/2001 | Shikata ....................... | 359/140 |
| 2002/0018259 A1 | 2/2002 | Hait .......................... | 359/123 |

FOREIGN PATENT DOCUMENTS

| | | |
|---|---|---|
| EP | 1039669 A2 | 9/2000 |
| EP | 1087478 A1 | 3/2001 |
| EP | 1137213 A2 | 9/2001 |
| WO | WO 01/22627 A1 | 3/2001 |

OTHER PUBLICATIONS

"Continuous Dispersion Managed Fiber For Very High Speed Soliton Systems" Anis, et al ECOC 99.
CyOptics—Optical Time Division Multiplexing http//cyoptics.com/technology/otdm.sbtml, 2002.
"Pulse-overlapped dispersion-managed data transmission and intrachannel four-wave mixing" Optics Letters/vol. 24, No. 21/Nov. 1, 1999.

* cited by examiner

*Primary Examiner*—Leslie Pascal
(74) *Attorney, Agent, or Firm*—Juliana Agon

(57) ABSTRACT

For suppressing intra-channel four wave mixing in a time division multiplexing (TDM) system, where N synchronous data streams, each having a reduced data pulse width within a bit slot timing interval, from parallel to serial form, are converted for optically bit interleaving the N synchronous data streams into the optical communication link at a nominal bit slot delay between sequential N synchronous data streams related to the bit slot timing interval to provide a serial data sequence of short optical pulses having an equal bit slot delay between sequential pulses, a sequential bit slot delay is varied between two of the short optical pulses to provide an unequal bit slot delay between sequential pulses within the serial data sequence of short optical pulses for suppression of undesired intra-channel four-wave mixing pulses among the pulses and thereby, improvement of transmission performance.

20 Claims, 13 Drawing Sheets

FIG. 12  CLASSICAL FWM (WDM)
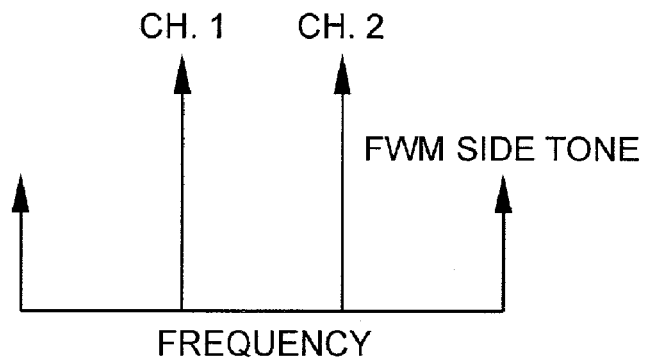
FIG. 13  SINGLE CHANNEL FWM (sFWM)
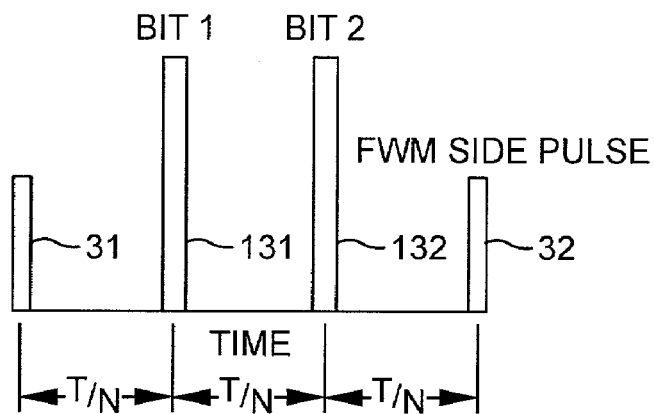

US 7,027,735 B2

UNEQUAL PULSE SPACER

BACKGROUND OF THE INVENTION

FIELD OF THE INVENTION

The present invention relates generally to parallel to serial conversion of N synchronous data streams in optical communication systems, and particularly to high-speed time domain multiplexing optical transmission systems or optical time division multiplexing (OTDM) systems and suppression of fiber nonlinear impairments in such systems.

TECHNICAL BACKGROUND

For terrestrial long haul optical communication systems with line rate greater than or equal to 40 Gb/s and especially in transmission links using dispersion managed fiber where a continuous fiber with built-in, non-spliced dispersion compensation created by alternating dispersion sections of opposite sign of opposite dispersion is used, it is known that the dominant penalty is due to intra-channel four wave mixing (FWM). Either a bit rate larger than 40 Gb/s or large dispersion (>4 ps/nm.km) gives rise to large pulse width variations along the fiber propagation which causes the neighboring pulses to mix and thereby, enhancing the intra-channel FWM.

This nonlinear mixing of closely spaced pulse pairs generates undesired temporal side pulses or ghost pulses due to time domain four-wave mixing. The ghost pulses fall on the center of adjacent bit slots. As a result, the ghost pulses falling on the bit '1' or Mark pulses, cause amplitude jitter which is one of the dominant penalties at the high bit rates, such as 40 Gb/s or greater.

For wavelength division multiplexing (WDM) systems, it is known to use unequally spaced channels to suppress four wave mixing in the frequency domain, as represented by the classical four-wave mixing drawing of FIG. 12. But the four wave mixing (FWM) in the time domain of FIG. 13 is not the same as in the frequency domain. In the frequency domain of FIG. 12, classical FWM causes interaction between different channels. In contrast, time domain four wave mixing is the interaction between neighboring pulses 131 and 132 causing four wave mixing side or ghost pulses 31 and 32 (again in the time domain).

Therefore, there is also a need to suppress four-wave-mixing in the time domain.

SUMMARY OF THE INVENTION

One aspect of the invention is a method of suppressing intra-channel four wave mixing for improved transmission performance in a time division multiplexing (TDM) system where N synchronous data streams, each having a reduced data pulse width within a bit slot timing interval, from parallel to serial form, are converted for optically bit interleaving the N synchronous data streams into the optical communication link at a nominal bit slot delay between sequential N synchronous data streams related to the bit slot timing interval to provide a serial data sequence of short optical pulses having an equal bit slot delay between sequential pulses. In such a TDM system, a sequential bit slot delay is varied between two of the short optical pulses to provide an unequal bit slot delay between sequential pulses within the serial data sequence of short optical pulses to improve transmission performance by suppressing intra-channel four wave mixing.

In another aspect, the present invention includes an added fiber length coupled to one of the second to last one or last one of the N−1 delayed branches, the added fiber length having an additional delay of 0.3 of the bit slot timing interval to delay the transmission of the center of a Mark pulse nominally centered at the middle of the bit slot timing interval on the second to last one or the last one of the delayed N−1 delayed branches the additional (0.3)T/N delay, where T is the bit period of a data stream before multiplexing or the parallel to serial conversion, and T equals 1/bit rate, such that after multiplexing or the parallel to serial conversion, the bit slot timing interval is equal to T/N. Hence, the nominally equal spacing between two sequential bits of the short multiplexed optical pulses which is nominally equal to T/N and the bit slot timing interval is now increased to a greater value for at least one of N multiplexed bits to provide an unequal spacing between sequential pulses greater than or equal to 1.3 T/N referenced from the beginning of each sequential bits within the serial data sequence of short optical pulses for detuning the pulse position of every N−1 one or last Nth one of the short optical pulses of the serial data sequence of short optical pulses for suppression of side pulses due to resonant intra-channel four-wave-mixing.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 12 is a representation of classical four-wave mixing in the frequency domain; and FIG. 13 is a representation of a single channel or intra-channel four-wave mixing in the time domain.

DETAILED DESCRIPTION OF THE PREFERRED EMBODIMENTS

Figure 1A:
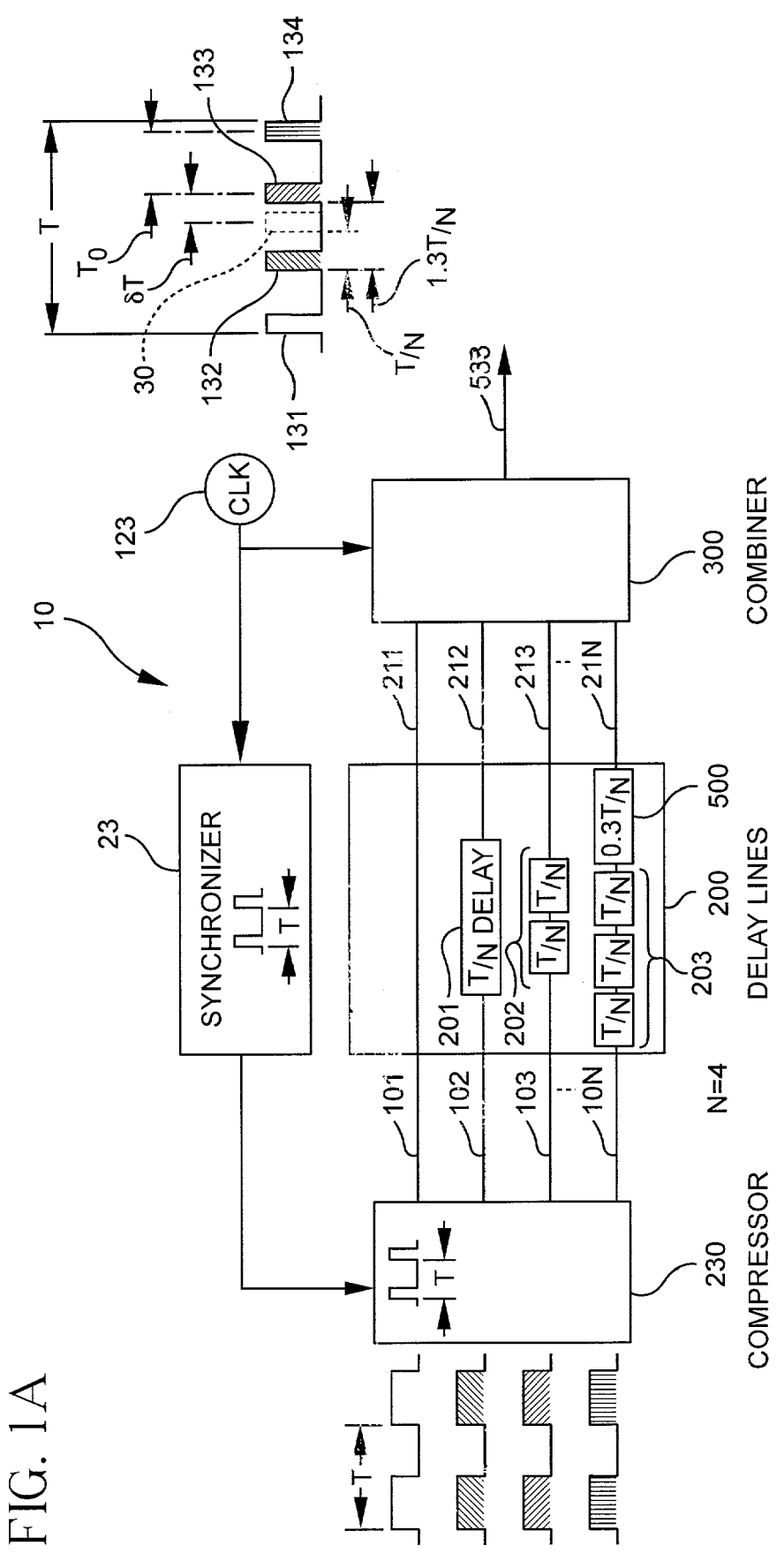
FIGS. 1A–C are schematic views of a general serial-to-parallel converter or a reversed parallel-to-serial converter 10, in accordance with the teachings of the present invention.

In a conventional OTDM system, the pulses within each bit slot are equally spaced from each other. Because of this equal bit slot spacing, the nonlinear penalty due to four-wave mixing is at a maximum, especially over long fiber span distances of dispersion managed fiber. Equally spaced pulses generate ghost pulses or four-wave side pulses exactly at the center of equally spaced bit slots, as seen in FIG. 13. If the side pulse coincides with a Mark pulse, representing a "1", resonant interaction occurs. The present invention teaches a way to suppress the resonant interaction by forcing an unequal pulse spacing between Mark pulses, as seen in FIG. 1A. The unequal pulse spacing is realized by shifting or otherwise adjusting the delay between pulses in optical time division multiplexing (OTDM) systems of FIG. 1B so that the intra-channel four wave mixing is no longer resonant. Electrical time domain multiplexing (ETDM) systems of FIG. 1C could also use the present invention's teaching of providing a deterministic unequal spacing between bits to suppress intra-channel FWM. Hence, the present invention is applicable in any TDM system where the delays of the multiplex signals are adjusted such that the optical data will have unequal delay.

In general, in accordance with the teachings of the present invention, an unequal bit slot spacing technique is taught where every predetermined bit slot, pre-selected from 1 out of N bit slots, in a time division multiplexed data stream of N data streams, is delayed or otherwise shifted in the time domain to avoid resonating the four wave ghost pulses with Mark pulses in order to reduce the intra-channel FWM. Specifically, if N is in the range of 3 to 4, every third or fourth bit slot is shifted to have an unequal delay to reduce intra-channel four wave mixing. In order to time division multiplex N data streams, a parallel to serial conversion is usually first performed where each of the N−1 data streams are respectively delayed by N−1 optical delay elements coupled to each of the N−1 optical compressed data encoders. Each of the delay elements has a nominal delay that is related to the bit slot timing interval for ensuring nonoverlapping serial multiplexing of the short optical pulses into the optical communication link. Hence, after the parallel to serial conversion, every third or fourth bit slot is additionally delayed to suppress intra-channel FWM.

Reference will now be made in detail to the present preferred embodiments of the invention, examples of which are illustrated in the accompanying drawings. Whenever possible, the same reference numerals will be used throughout the drawings to refer to the same or like parts. One embodiment of the serial-to-parallel or reversed parallel-to-serial converter of the present invention is shown in FIGS. 1A–C, and is designated generally throughout by the reference numeral 10.

Figure 1B:
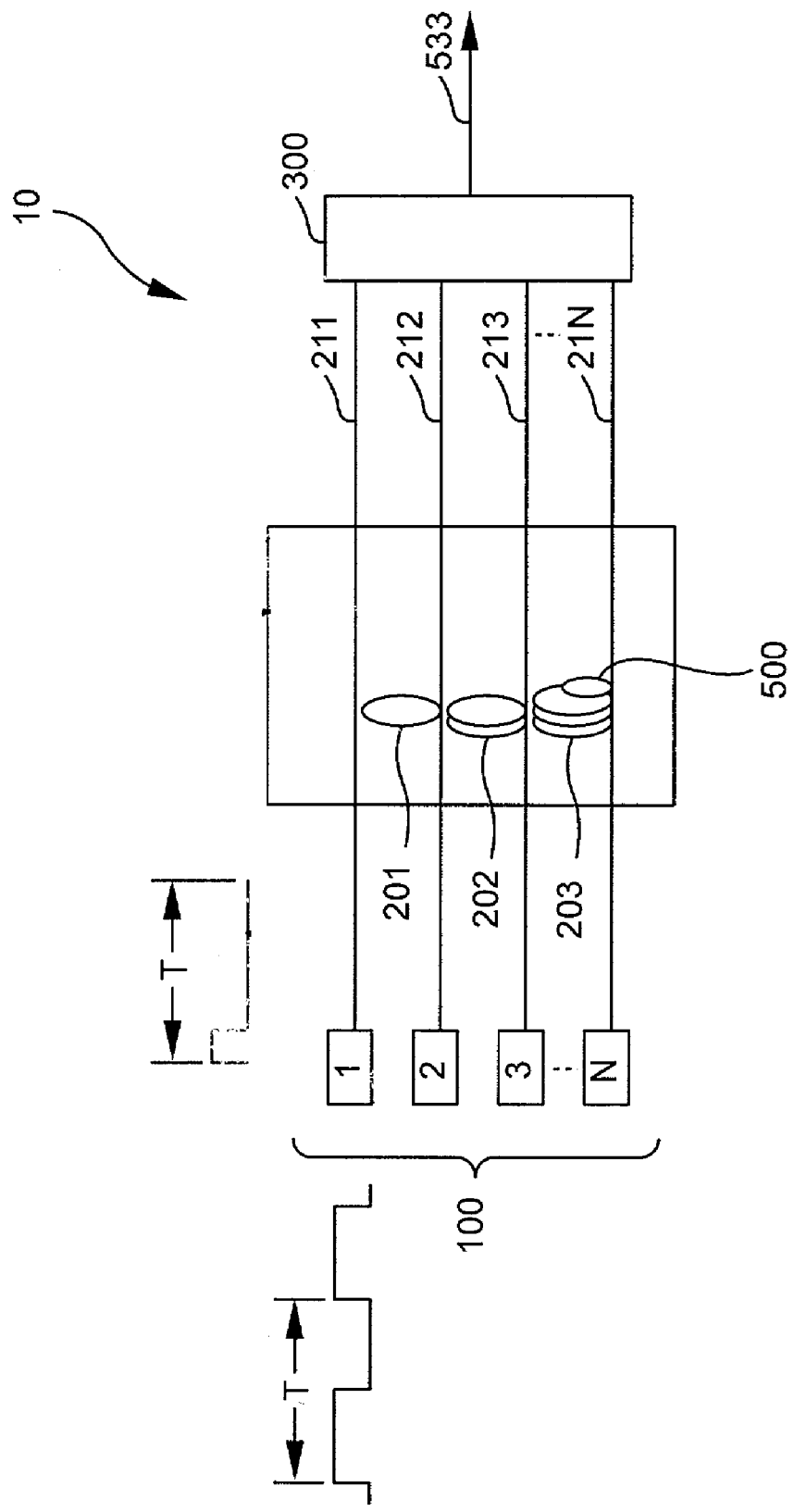
Figure 1C:
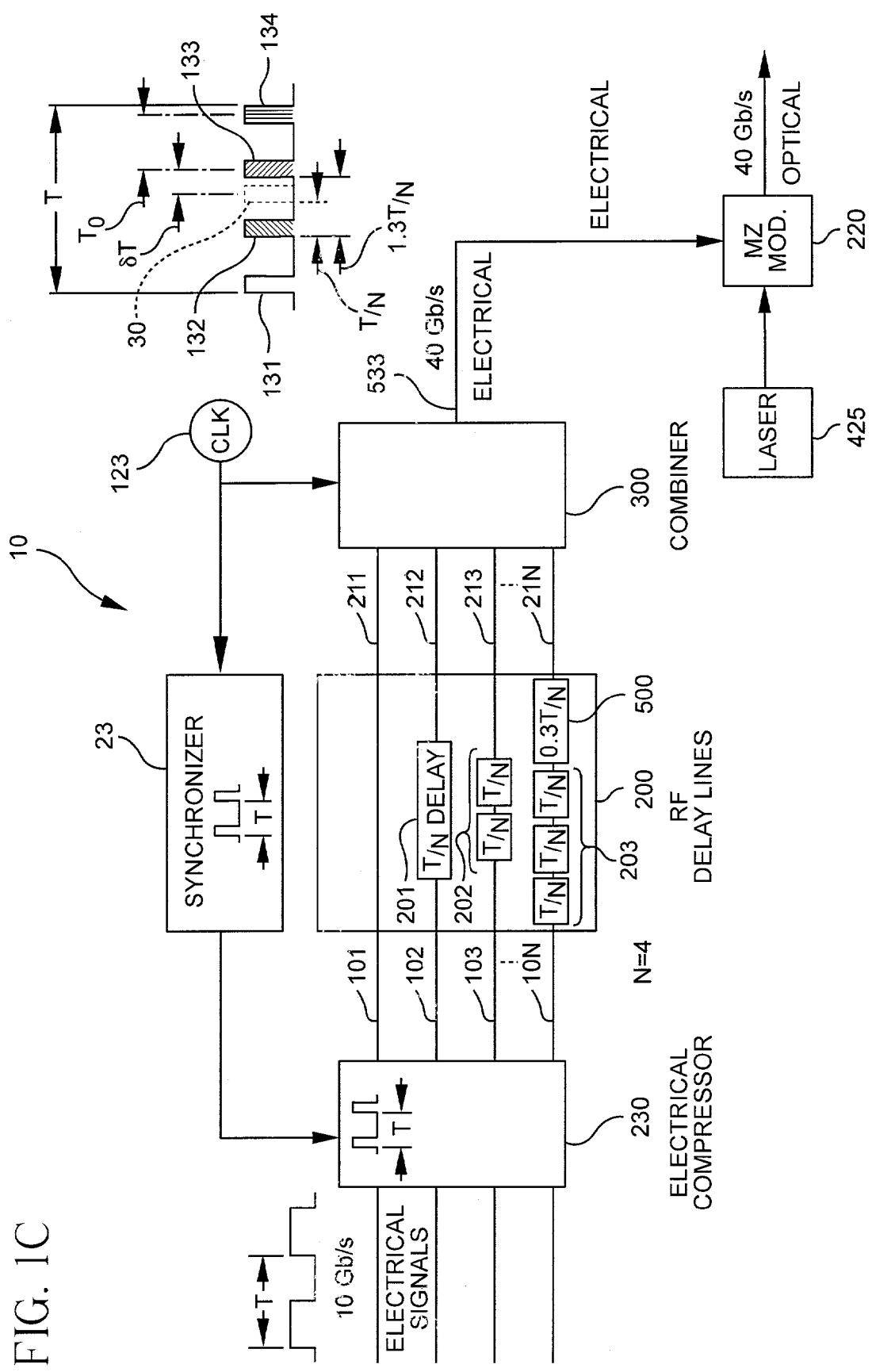

Referring to FIGS. 1A–C, an optical parallel-serial converter 10 for converting N synchronous data streams, each having a nominal data pulse width, from parallel to serial form for optically time multiplexing into an optical communication link is represented. The optical communication link is preferably a network of optical fibers which can include a plurality of amplifiers, positive and negative dispersion fibers for repeating the multiplexed signal over the fibers. For such a time division multiplexing (TDM) system, amplitude shift keying modulation techniques of the return to zero (RZ) format is usually used for time multiplexing N synchronous RZ data streams, each having a bit period of T, before multiplexing or the parallel-to-serial conversion, and pulsing at a bit rate of 1/T into a serial data sequence of short pulses operating at a multiplexed bit rate or baud rate of N/T for multiplexing into the optical communication link within a frame.

A plurality of N optical compressed data encoders 101-10N are disposed in the optical communication link for providing N encoded data streams having data pulses, before the parallel-to-data conversion, each having a bit period=T=1/bit rate and a pulsewidth that is smaller than T/N where T/N will be the bit slot timing interval of the frame of the multiplexed signal.

A combiner 300 bit interleaves the N encoded data streams into a frame of serial data sequence of short pulses for multiplexing into the optical communication link. A plurality of N−1 delay elements 201–203 are coupled to each of the N−1 compressed data encoders 100. In the optical TDM version FIG. 1B of FIG. 1A, the delay elements preferably are fiber sections. Similarly, in the electrical TDM version FIG. 1C of FIG. 1A, the delay elements can be radio frequency (RF) delay lines, such as microwave stubs and other tuning elements. Each delay element 201–203 has a nominal delay related to a multiple of the bit slot timing interval T/N, after the parallel-to-serial conversion, for ensuring nonoverlapping serial multiplexing of the short optical pulses into the optical communication link.

With such suitable parallel-to-serial conversion, at least one intra-channel four-wave mixing eliminating optical delay element 500 is coupled to at least one of the N−1 optical delay elements 201–203 for increasing a sequential bit slot delay between two of the short optical pulses to provide an unequal bit slot delay between sequential pulses within the serial data sequence of short optical pulses for suppression of undesired four-wave mixing pulses of the N synchronous data streams. By repositioning one of the short pulse bits within a frame, the interaction between the ghost pulses no longer occur because the ghost pulses no longer fall on the center of adjacent bit slots to interact resonantly.

The timing of the combiner 300 and the compressor 230 are controlled by a synchronizer 23 that is clocked by a controller or a clock source 123. In other embodiments, the delay elements 200 and 500 can also be provided by the controller or clock source 123 or other types of commutators.

Figure 9:
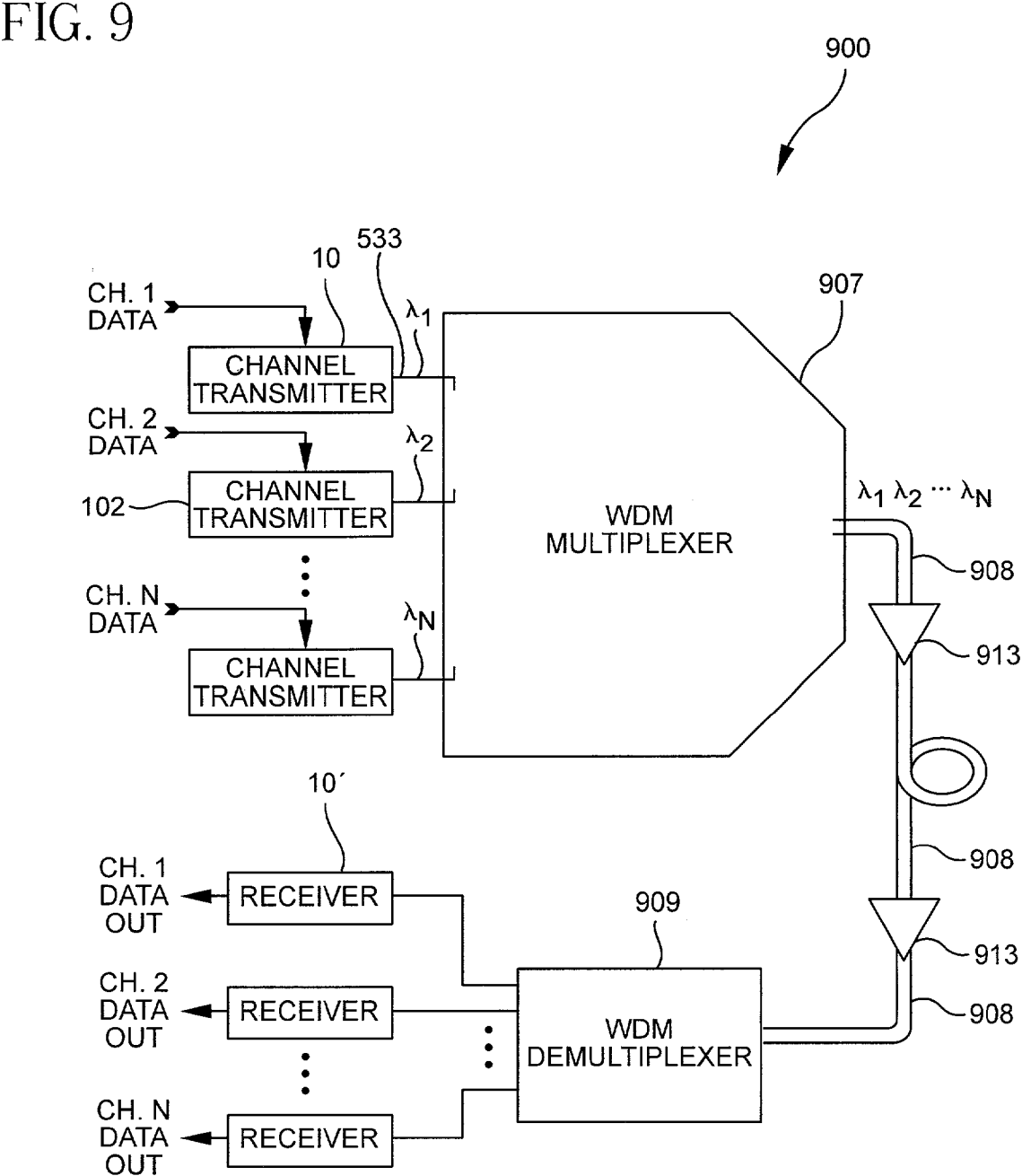
FIG. 9 is a schematic diagram of the converter 10 of FIG. 1 or FIG. 4 in a WDM system 900, in accordance with the teachings of the present invention.

In the optical TDM version of FIG. 1B, the multiplexed and framed output signal 533 can be immediately used as a WDM channel in FIG. 9. However, in the electrical TDM version of FIG. 1C, the multiplexed and framed output signal 533 is still an electrical signal that is further provided to a Mach-Zehnder modulator 220 as a modulating signal for a continuous laser source 425 before the modulated output from the Mach-Zehnder modulator 220 is provided as an optical signal for use as the WDM channel in FIG. 9.

Figure 2:
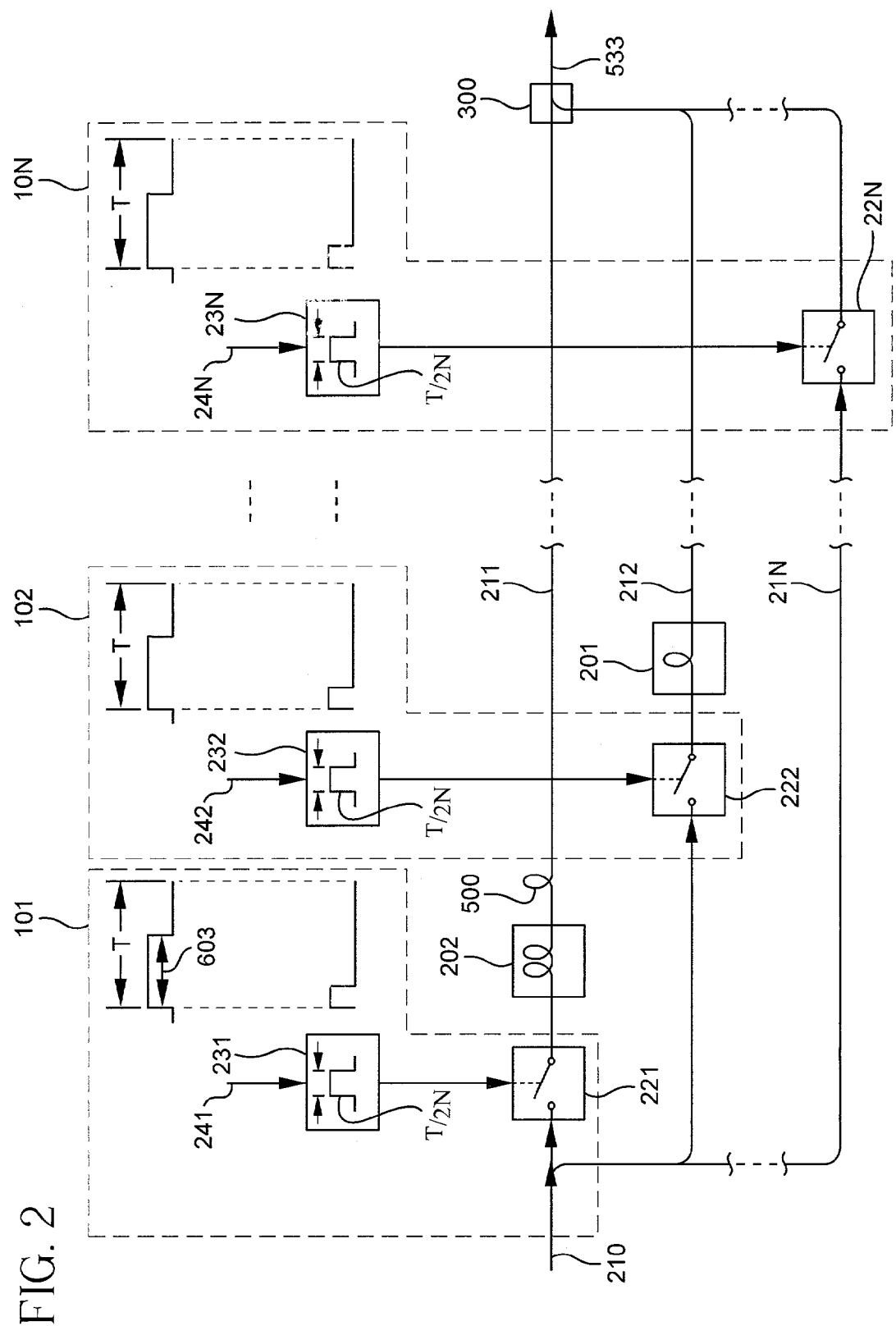
FIG. 2 is a representation of a single optical sourced version of the converter 10 of FIG. 1B, in accordance with the teachings of the present invention.

Referring to FIG. 2, an example of N optical compressed data encoders of FIG. 1B is represented where N is 3 for simplicity. To externally switch or modulate a continuous light source that is present on an incoming communication link 210, N optical modulators 221–22N are disposed in N parallel optical communication link branches 211–21N. The N optical modulators are switches or data modulators such as Mach-Zehnder interferometers usually made from Lithium Niobate or electro-absorption modulators. N number of bit compressors, such as pulse or optical compressors 230, individually represented as 231–23N, are coupled to each respective one of the N optical modulators 221–22N for applying one of the N synchronous data streams 241–24N to each of the N optical modulators 221–22N. Each of the N synchronous data streams have a bit period of T in the return-to-zero (RZ) format and can be in an electrical form where half of the bit period is the nominal data pulse width. The bit compressors 241–24N are synchronized with each other by a timing signal and the compressors are designed to provide a timing pulse with a bit slot timing interval T/N. Hence, a reduced, narrowed or short pulse results which is not greater than the Nth fraction of the nominal data pulse width for clocking each of the N bit compressors 231–23N for reducing the nominal data pulse width to the bit slot timing interval to provide N encoded data streams of short optical pulses. Hence, for N modulators 221–22N, N compressors 231–23N would be used. As is known, the compressors 231–23N are matched pairs of positively and negatively dispersed fibers, loop mirrors, or other optical components for shaping an optical pulse.

As also appreciated, there are many ways to implement a parallel-to-serial conversion to enable optical time division multiplexing. The teachings of the present invention is not limited to any particular implementation but usable with any types of optical time division multiplexing (OTDM) or electrical time division multiplexing (ETDM).

Figure 3:
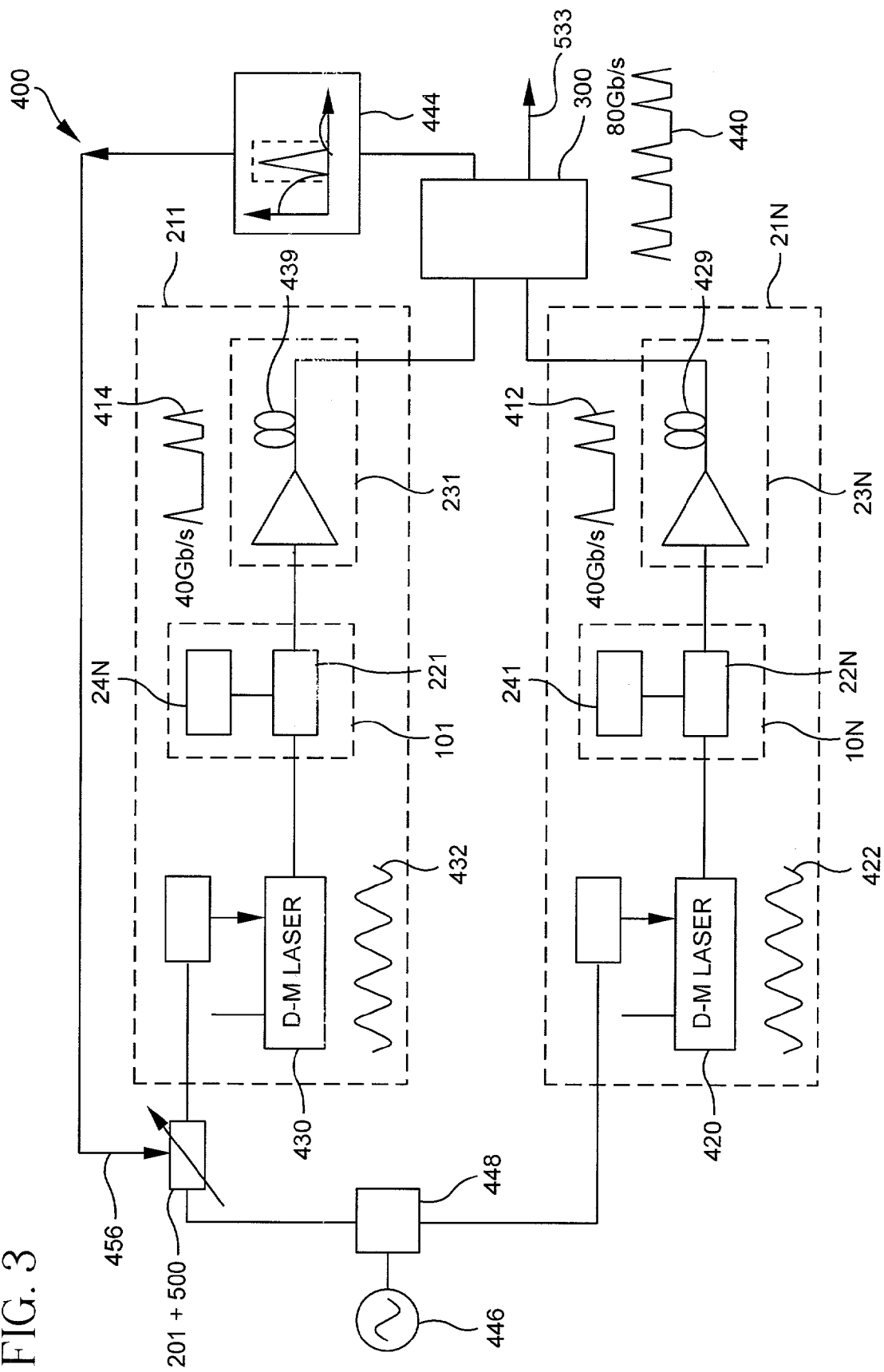
FIG. 3 is a representation of one embodiment of the single sourced optical sourced version of the converter 10 of FIG. 2, in accordance with the teachings of the present invention.

Referring to FIG. 3, FIG. 18 of European patent application EP 1087478A1 is hereby reproduced and incorporated to show how the present invention could work with this particular OTDM implementation with N equals 2 for simplicity and reference numbers correspondence from FIG. 2 shown. Instead of having a separate synchronization element, one directly modulated laser source from a pair of dual-mode lasers 420 and 430 is split into two data modulators 101–10N so that there is a fixed phase relationship between the pair of dual-mode lasers 420 and 430 to avoid the need for synchronization. To modify this known implementation to suppress four-wave mixing, in accordance with the teachings of the present invention, the N data modulators 221–22N are forced to haven an unequal delay 500 for detuning one of the short pulses away from the four-wave-mixing condition. Preferably, the unequal delay 500 is adjustable and can include the nominal delay 201 representing a bit time slot timing interval for ensuring nonoverlapping serial multiplexing of the short optical pulses from the two encoded branches 211–211N into the optical communication link.

Figure 4:
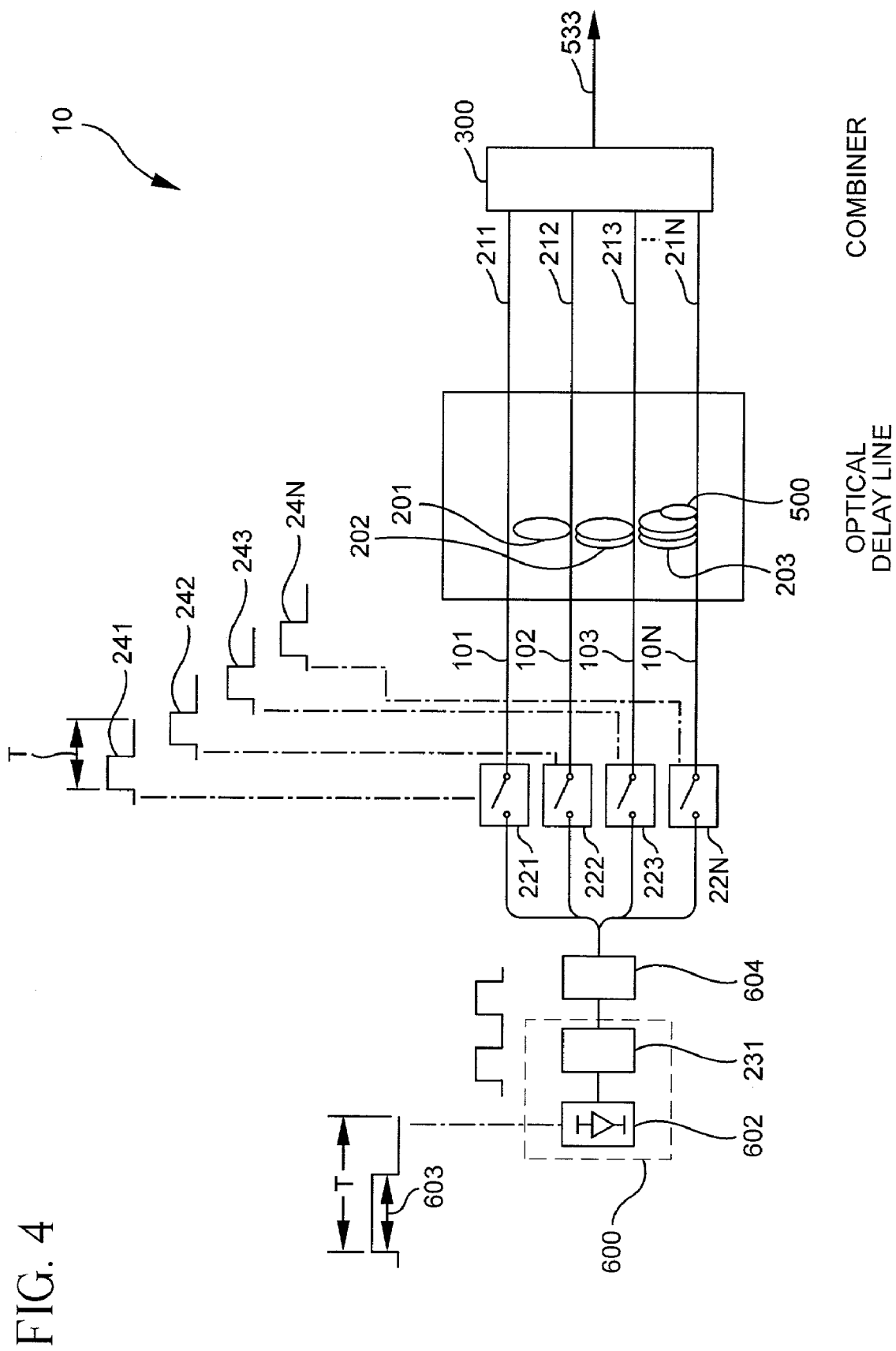
FIG. 4 is a representation of a multiple optical sourced version of the converter 10 of FIG. 1, in accordance with the teachings of the present invention.

Referring to FIG. 4, the N optical compressed data encoders 101–10N of FIG. 1A includes another OTDM implementation where only one bit compressor is needed instead of the N bit compressors in FIG. 2. A compressed pulse source 600 provides a short pulse optical stream having a synchronized timing signal having a timing pulse with the bit slot timing interval T/N which is not greater than the Nth fraction of the nominal data pulse width for reducing the bit period by N to N bit slot timing intervals. The compressed pulse source 600 preferably includes a laser pulse source 602 and a bit compressor 231. The rest of the N optical compressed data encoders 101–10N includes a splitter 604, such as a power splitter, coupled to the compressed pulse source 600 for splitting the short pulse optical stream into N short pulse optical streams and N optical modulators 221–22N disposed in the optical communication link. Each of the N optical modulators 221–22N are coupled to the splitter 604 for modulating each of the N short pulse optical streams by one of the N synchronous data streams to provide N encoded data streams.

Figure 5:
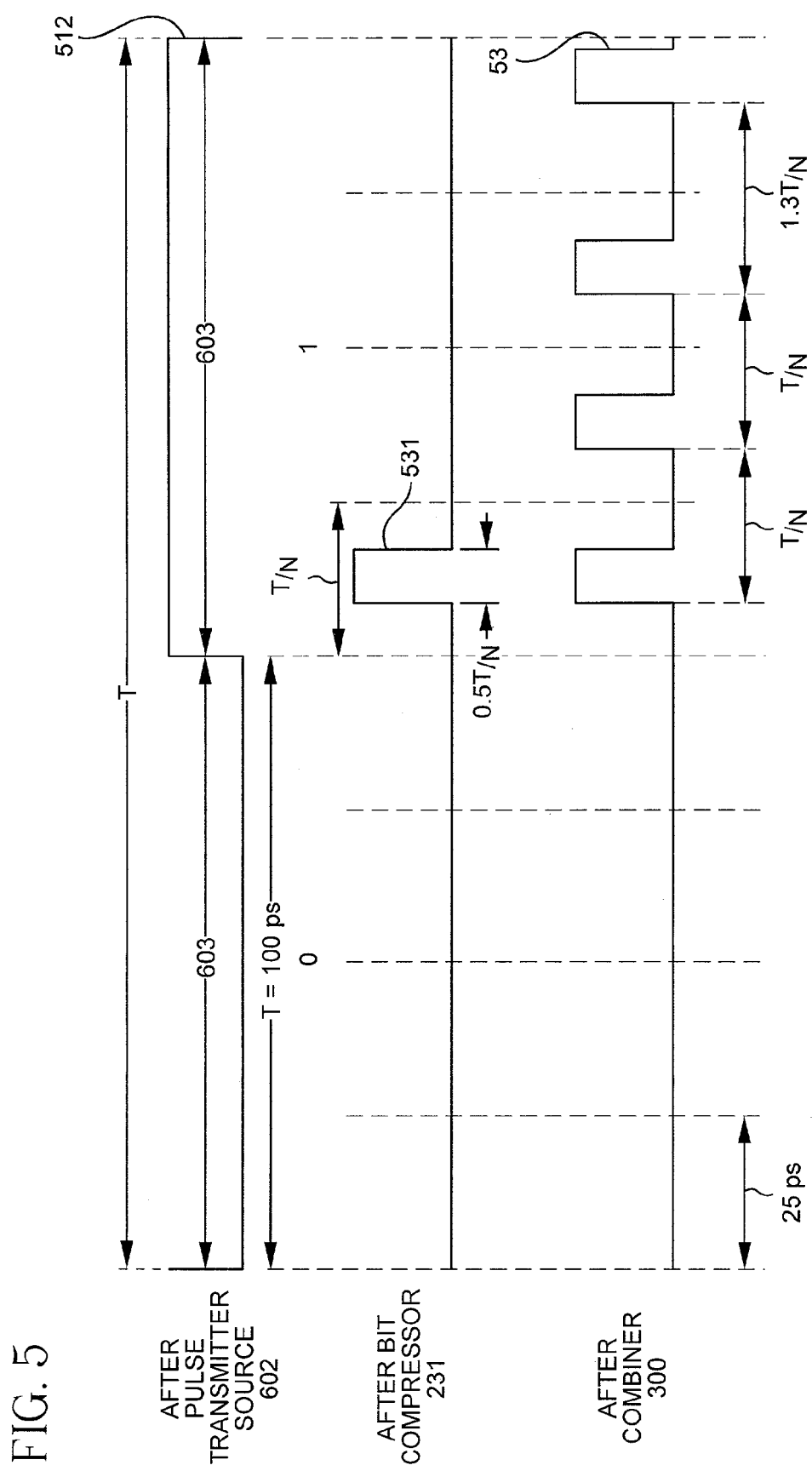
FIG. 5 is a general timing diagram of the pulse stream as it travels in the converter 10 of FIG. 4, in accordance with the teachings of the present invention.

Operationally and referring to FIGS. 4 and 5, a TDM system 10 is thus taught for time multiplexing N synchronous RZ data streams 241–24N, each having a bit period of T, before multiplexing, and having a bit rate of 1/T into a serial data sequence of short optical pulses operating at a bit rate of N/T for multiplexing into an optical communication link. The laser pulse source 602 generates a return-to-zero (RZ) pulse train 512 with a bit rate of 1/T and having the bit period of T for accommodating a nominal RZ pulse width 603 of T/2 or less. The bit compressor 231 coupled to the laser pulse source 602 provides a short pulse optical stream 531 with a bit rate of 1/T. The bit compressor 231 compresses the pulses without changing the pulse separation and the nominal pulse width after the compression is less than or equal to 0.5 T/N.

The splitter 604 coupled to the bit compressor 231 splits the short pulse optical stream pulsing at 1/T into N short pulse optical streams pulsing at 1/T on N parallel optical communication link branches 211–212N. The N data modulators 221–22N are cascaded in each of the N parallel optical communication link branches 211–21N. Each of the N data modulators 221–22N are coupled to the splitter 604 for modulating each of the N short pulse optical streams pulsing at 1/T by one of the N synchronous data streams 241–24N to provide N encoded data streams pulsing at 1/T wherein a MARK pulse is represented by a non-zero level voltage for the duration of the short pulse width and a zero voltage for the rest of the bit slot timing interval and an absence of a MARK pulse by the zero voltage over the entire bit slot timing interval.

The N parallel optical communication link branches 211–21N N−1 are made-up of delayed branches having different fiber lengths 201–203 at multiples of a nominal delay that is equal to the bit slot timing interval T/N to delay the transmission of the center of a Mark pulse nominally centered at the middle of the bit slot timing interval on a non-delayed link branch to 1 time the bit slot timing interval T/N, synchronized from the beginning of the bit period on a first one of the N−1 delayed branches, to 2 times the bit slot timing interval, synchronized from the beginning of the bit period on a second one of the N−1 delayed branches, and so on, to 3 times the bit slot timing interval T/N, synchronized from the beginning of the bit period on a N−1 last one of the N−1 delayed branches for ensuring nonoverlapping serial multiplexing of the short optical pulses into the optical communication link.

A multiplexer or combiner 300, such as an optical time division multiplexer (OTDM) for optical time division multiplexing (or an electrical multiplexer for electrical time domain multiplexing), bit interleaves the N encoded data streams pulsing at 1/T into the serial data sequence of short optical pulses operating at the bit rate of N/T for multiplexing into the optical communication link.

According to the teachings of the present invention, an added fiber length 500 is coupled to one of the second to last one or last one 21N of the N−1 delayed branches. The added fiber length 500 has an additional delay of 0.3 of the bit slot timing interval T/N to delay the transmission of the center of a Mark pulse nominally centered at the middle of the bit slot timing interval on the second to last one or the last one of the delayed N−1 delayed branches the additional (0.3)T/N delay, synchronized from the beginning of the bit period for increasing a nominally equal spacing greater than or equal to T/N between two sequential bits of the short optical pulses to provide an unequal spacing between sequential pulses greater than or equal to 1.3 T/N referenced from the beginning of each sequential bits within the serial data sequence of short optical pulses for detuning the pulse position of every N−1 one or last Nth one of the short optical pulses of a frame of the serial data sequence of into a frame of short optical pulses 533 for suppression of side pulses due to resonant intra-channel four-wave-mixing.

Figure 6:
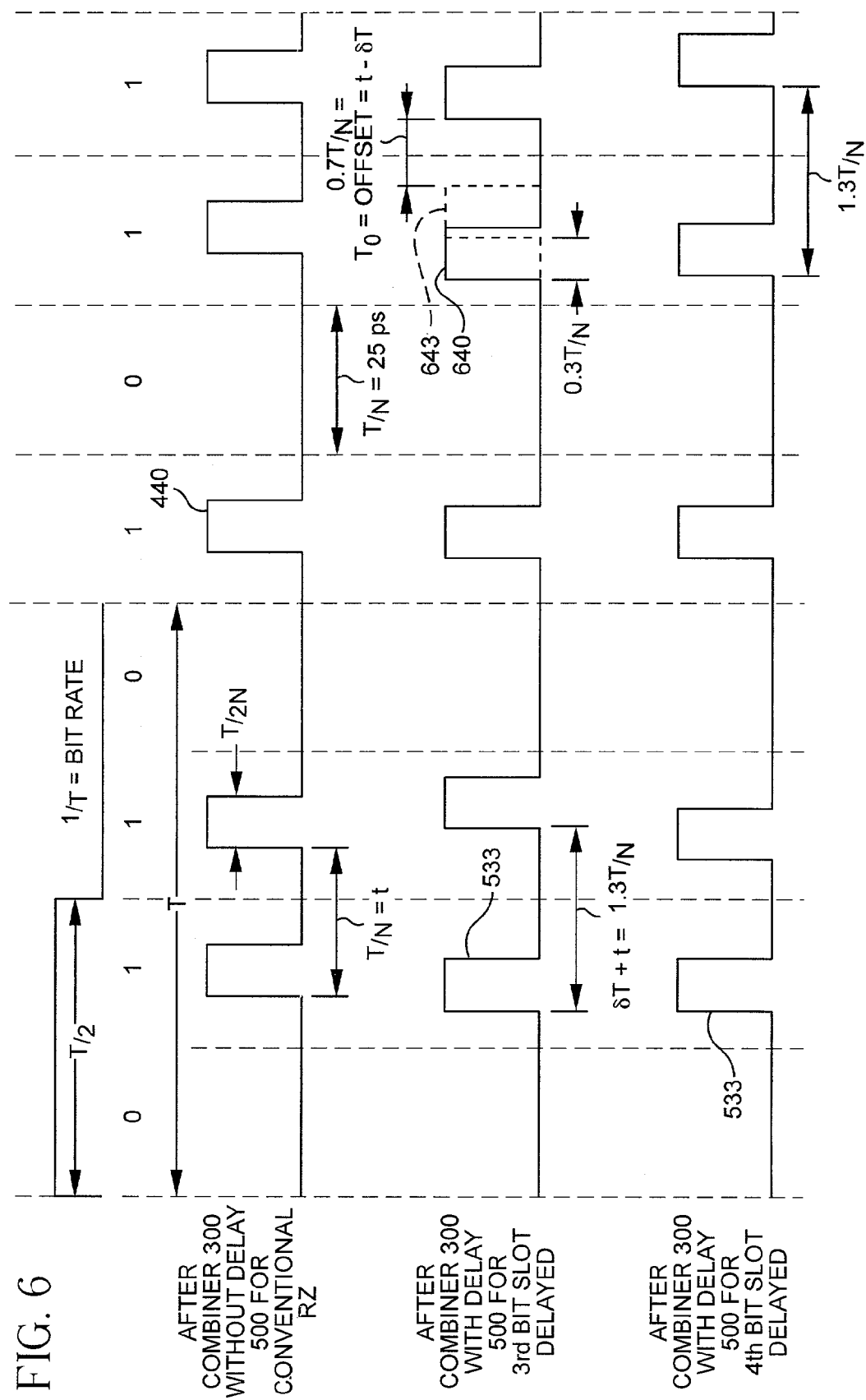
FIG. 6 is a general timing diagram of the unshifted and shifted pulse streams of the converter 10 of FIG. 4 for a multiplexed system having a bit rate of N/T, in accordance with the teachings of the present invention.

Referring to FIG. 6, regardless of what type of parallel-to-serial conversion is used for time division multiplexing, the present invention teaches a bit delayer, in the preferable form of an additional fiber delay, in a parallel-to-serial converter. The bit delayer adds an additional delay of 0.3 of the bit slot timing interval T/N to delay the transmission of the center of a Mark pulse 640 nominally centered at the middle of the bit slot timing interval on the second to last one or the last one of the bit slots, synchronized from the beginning of the bit period T for increasing a nominally equal spacing greater than or equal to T/N between two sequential bits of the short optical pulses to provide an unequal spacing between sequential pulses greater than or equal to 1.3 T/N referenced from the beginning of each sequential bits within the serial data sequence of short optical pulses for detuning the pulse position 643 of every N−1 one or last Nth one of the bit slots of a frame of the serial data sequence of a frame of short optical pulses 533 for suppression of side pulses due to resonant intra-channel four-wave-mixing.

Hence, a method of suppressing intra-channel four wave mixing for improved transmission performance in any time division multiplexing system is taught. N synchronous data streams, each having a reduced data pulse width 0.5 T/N within a bit slot timing interval T/N, are each converted from parallel to serial form 440 for optically bit interleaving the N synchronous data streams into the optical communication link at a nominal bit slot delay between sequential N synchronous data streams related to the bit slot timing interval to provide a serial data sequence of short optical pulses having an equal bit slot delay T/N between sequential pulses. The bit delayer varies a sequential bit slot delay between two of the short optical pulses to provide an unequal bit slot delay between sequential pulses within a frame of the serial data sequence of short optical pulses 533 for suppression of undesired four-wave mixing pulses of the N synchronous data streams to improve transmission performance by suppressing intra-channel four wave mixing.

Figure 7:
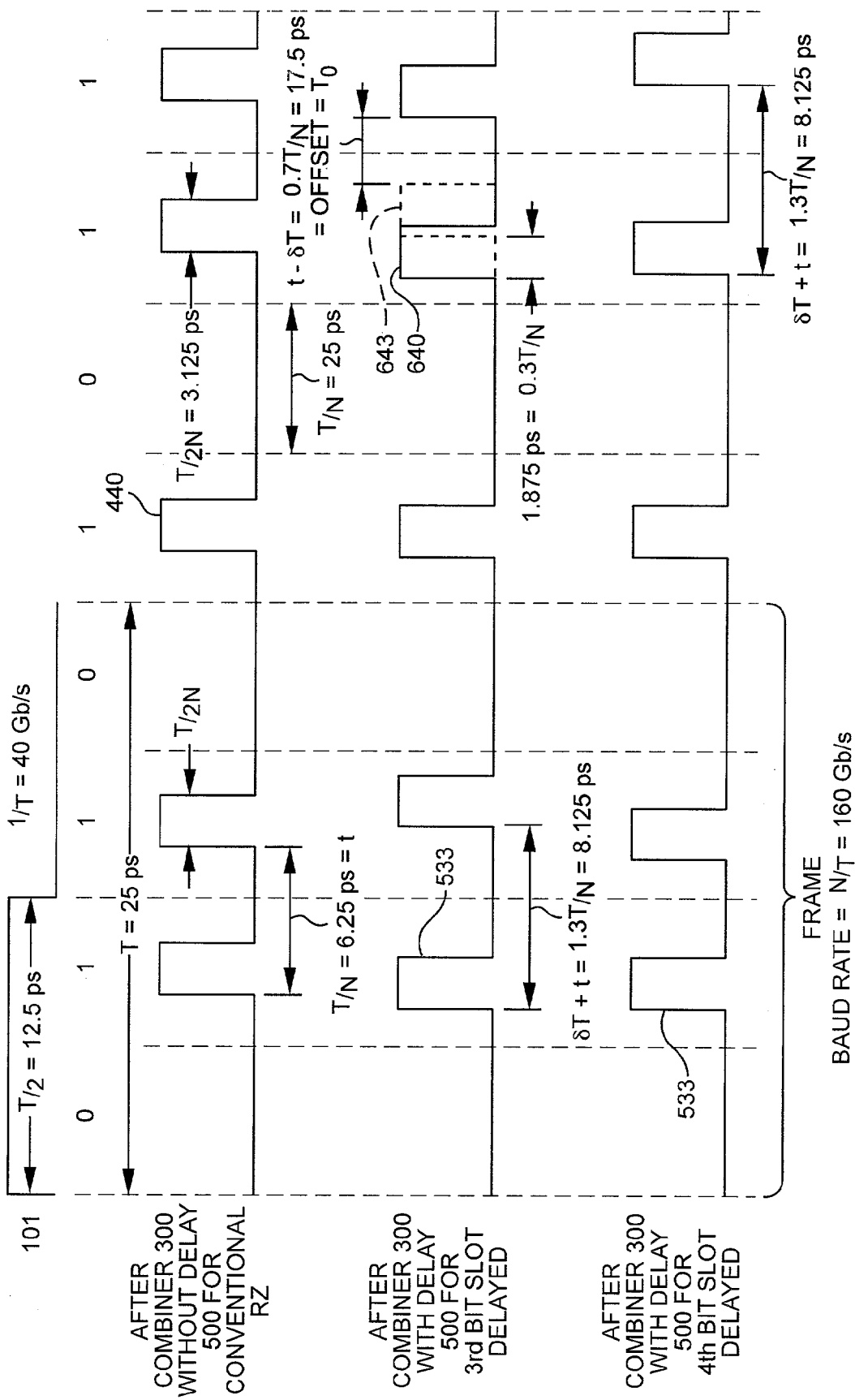
FIG. 7 is a timing diagram of the unshifted and shifted pulse streams of the converter 10 of FIG. 4 for a multiplexed system having a bit rate of N/T=160 Gb/s, in accordance with the teachings of the present invention.

Referring to FIG. 7 for substituting N=4, the bit period T=25 ps for time multiplexing 4 synchronous RZ data streams, each having the bit or nominal pulse period of 25 ps and pulsing at the bit rate of 40 Gb/s, the frame of serial data sequence of short optical pulses 533 operating at the baud rate of 160 Gb/s results when the bit period of 25 ps is subdivided into N bit slot intervals of 6.25 ps. Four synchronous data streams are provided with a 40 Gb/s return-to-zero (RZ) pulse train having the bit period of 25 ps for accommodating the nominal RZ pulse width of 12.5 ps. After pulse compression and power splitting, four short data encoded pulse optical streams 440 at 40 Gb/s with the bit slot timing interval of 6.25 ps having a short pulse width of less than or equal to 3.125 ps for accommodating the short pulse and the returned to zero portion of the pulse within the bit slot timing interval result. In each of the four encoded data streams 440, a MARK or "1" pulse is represented by the non-zero level voltage over the short pulse width and the zero voltage over the rest of the bit slot timing interval and the absence of a MARK pulse or the zero representation, by the zero voltage over the entire bit slot timing interval. After bit interleaving and delaying of the bit in the third or fourth bit slot by an additional delay of 0.3 of the bit slot timing interval equal to 1.875 ps, synchronized from the beginning of the bit period, the nominally equal spacing greater than or equal to 6.25 ps between two sequential bits of the short optical pulses is now shifted to provide the unequal spacing between sequential pulses greater than or equal to 8.125 ps within a frame of the serial data sequence of short optical pulses 533 for detuning the pulse position of every third or fourth short optical pulses of the serial data sequence of short optical pulses for suppression of side pulses due to resonant intra-channel four-wave-mixing.

Figure 8:
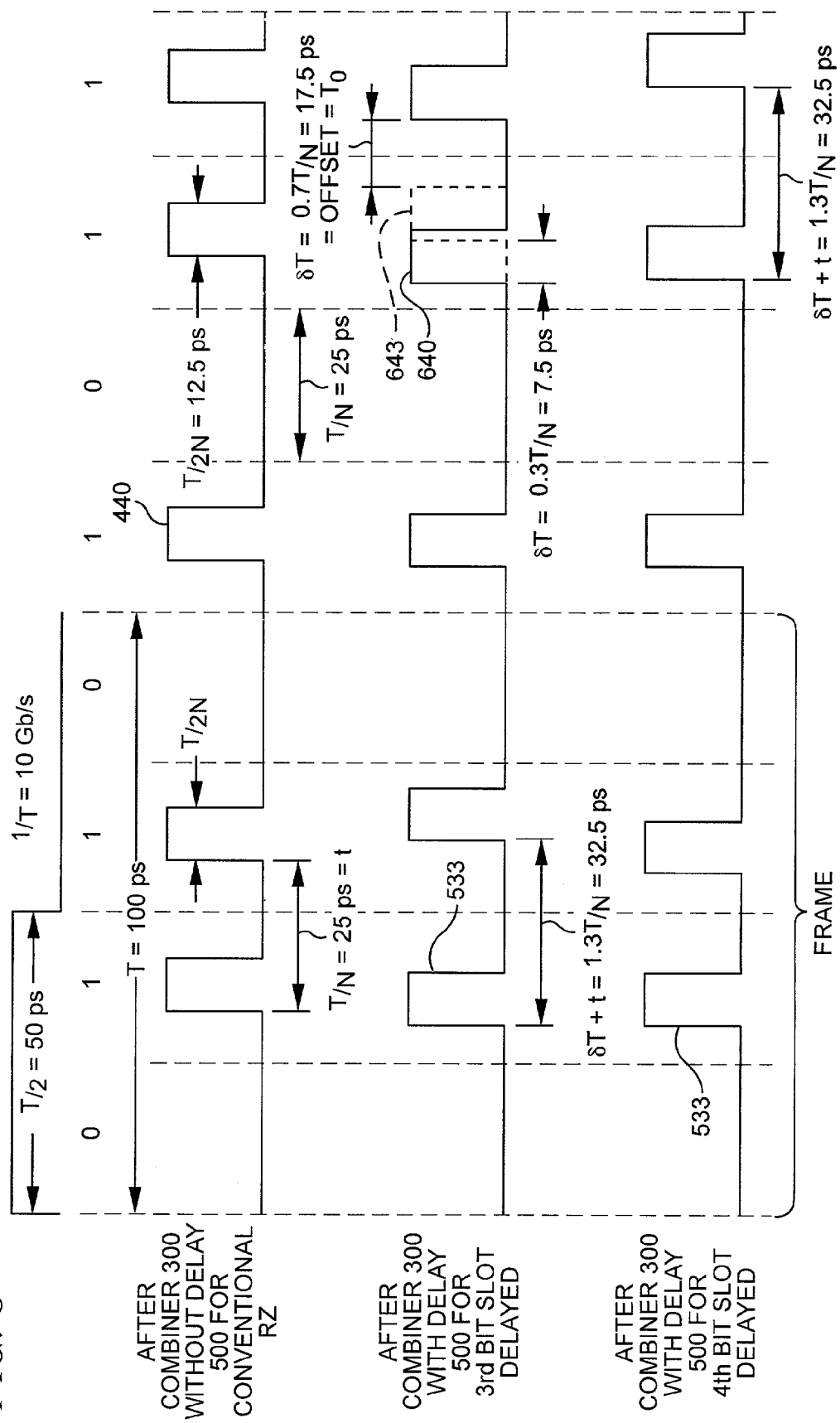
FIG. 8 is a timing diagram of the unshifted and shifted pulse streams of the converter 10 of FIG. 4 for a multiplexed system having a bit rate of N/T=40 Gb/s, in accordance with the teachings of the present invention.

Similarly, referring to FIG. 8, when N=4, the bit period T=100 ps, for any type of time multiplexing 4 synchronous RZ data streams, each having the bit period of 100 ps and pulsing at the pulse rate of 10 Gb/s, the serial data sequence of short optical pulses operating at the bit rate of 40 Gb/s results when the bit period of 100 ps is subdivided into N bit slot intervals of 25 ps. After pulse compression and power splitting, four short data encoded pulse optical streams 440 at 10 Gb/s with the bit slot timing interval which is 25 ps having a short pulse width less than or equal to 12.5 ps for accommodating the short pulse and the returned to zero portion of the pulse within the bit slot timing interval result. In each of the four encoded data streams 440, a MARK or "1" symbol is represented by a non-zero level voltage for the duration of the short pulse width and the zero voltage for the rest of the bit slot timing interval and the absence of the MARK symbol or the zero symbol by the zero voltage over the entire bit slot timing interval. After bit interleaving and delaying of the bit in the third or fourth bit slot by an additional delay of 0.3 of the bit slot timing interval equal to 7.5 ps, synchronized from the beginning of the bit period, the nominally equal spacing greater than or equal to 25 ps between two of the short optical pulses is now adjusted to provide the unequal bit delay between sequential pulses of 32.5 ps within a frame of the serial data sequence of short optical pulses 533 for detuning the pulse position of every third or fourth short optical pulses of the serial data sequence of short optical pulses for suppression of side pulses due to resonant intra-channel four-wave-mixing.

Referring to FIG. 9, an exemplary multi-channel wavelength division multiplexing (WDM) lightwave communication system is shown. The serial-to-parallel converter of FIG. 1A is used as a channel transmitter 10 for installation as a single WDM channel RZ transmitter having at least a bit rate of 40 Gb/s, for example, in a set of similarly multiplexed single WDM channel RZ transmitters in a Wavelength Division Multiplexed (WDM) system 900 with a bitrate/channel greater than or equal to 40 Gb/s. Each such transmitter channel 10 generates separately modulated lightwave framed signals 533 at a separate single wavelength which is the carrier wavelength for the channel of interest. A WDM multiplexer 907 combines the separate modulated lightwave framed signals 533 into a single signal for transmission on a plurality of long spans of optical fiber 908 separated from one another by individual amplifiers 913, repeaters or regenerators to achieve long distance communication.

In the WDM system 900, the reversed operation of the parallel-to-serial converter 10 of FIG. 1A can easily be adapted for use as a serial-to-parallel converter for installation as a receiver 10' for use as a single WDM channel RZ receiver having at least a bit rate of 40 Gb/s, for example, in a set of similarly multiplexed single WDM channel RZ receivers in a Wavelength Division Multiplexed (WDM) system with a bitrate/channel greater than or equal to 40 Gb/s for reversing the operation from multiplexing to demultiplexing. The WDM demultiplexer 909 separates the different channels according to wavelength so that the signal on a corresponding carrier wavelength $\lambda_N$ is sent to the corresponding receiver 10'. The receiver 10' detects and process the received lightwave signal information to produce a data output signal for each particular channel of interest.

Hence, at the transmitter channel 10 of FIG. 9, every third pulse is preferably delayed by a suitable unequal bit slot spacing for temporal detuning $\delta T$, i.e. the pulse separation between the second pulse and third pulse is less than or more than bit period. As an example, for a 40 Gb/s multiplexed system of FIG. 8, the new bit period from the reduced bit slot timing interval is 25 ps. A temporal detuning $\delta T$ of 7.5 ps implies that every third pulse is separated from the fourth pulse by an offset of 0.7 T/N=17.5 ps instead of 25 ps which is the bit slot timing interval T/N.

At the receiver 10' of FIG. 9, the optical or electrical time division demultiplexer 300' of FIG. 1 re-adjusts the delay such that the pulse separation is uniform, in the reverse operation of receiver 10'.

With this bit re-positioning method to force the pulse separation to be unequal, the ghost or side pulses no longer fall on the center of bit "1". As a result, the interference between the ghost pulse and the bit "1" is suppressed.

EXAMPLES

The invention will be further clarified by the following examples.

Example 1

To confirm this method, the following numerical simulations have been performed with the following parameters for N=4: a baud rate of N/T=40 Gb/s, pulse width=5 ps≦0.5 T/N, pulse separation $\Delta T$=25 ps=bit slot timing interval, nonlinear coefficient=0.0025 W$^{-1}$ Km$^{-1}$, amplifier spacing=80 km, dispersion fiber management 908 is done by using a 40 kms long single mode fiber with D=17 ps/nm.km followed by reverse dispersion fiber of the same length and exactly opposite dispersion. Fiber loss=0.2 dB/km. The peak power=7 mW. Every third bit slot is shifted from the center of the bit slot by $\delta T$, the temporal detuning. The optical time division demultiplexer 300' in the receiver 10' readjusts the delay of every third bit in the receiver 10'.

Figure 10:
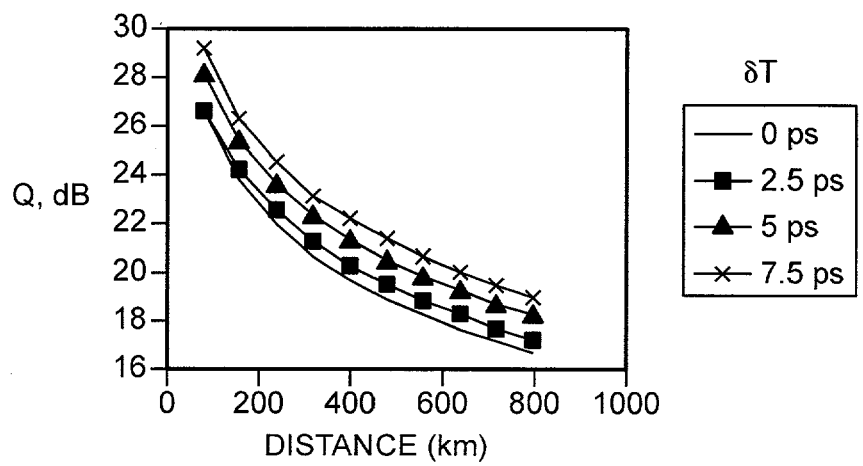
FIG. 10 is a temporal detuning (δT) graph as a function of the Q-factor of the system 900, in accordance with the teachings of the present invention.

Referring to FIG. 10, the results of a computer simulation of the nonlinear Schrodinger fiber equation for different temporal detuning parameter, $\delta T$ at a baud rate of N/T=40 Gb/s is shown where the quality (Q) factor is graphed as a function of temporal detuning $\delta T$ and N=4. The Q-factor is defined as $$Q(\text{dB}) = 10\log_{10}\frac{I_1 - I_0}{\sigma_1 + \sigma_0},$$

where $I_1$ and $I_0$ are the means of levels "1" and "0", and $\sigma_1$ and $\sigma_0$ are the stan deviations of levels "1" and "0", respectively.

The higher quality, associated with a higher temporal detuning $\delta T$, shows that FWM resonance can be suppressed by unequal pulse separation which improves the transmission performance. The back-to-back Q-factors are almost same for all the curves in FIG. 10 and the 3 dB improvement in the Q-factor after 800 km transmission with a 7.5 ps temporal detuning $\delta T$ is attributed solely to reduced nonlinear interaction. As the temporal detuning $\delta T$ increases beyond 12.5 ps=0.5 T/N, the simulation results have shown a degradation in performance. This degradation is due to the fact that inter symbol interference at the optical time division demultiplexer increases with temporal detuning $\delta T$.

Figure 11:
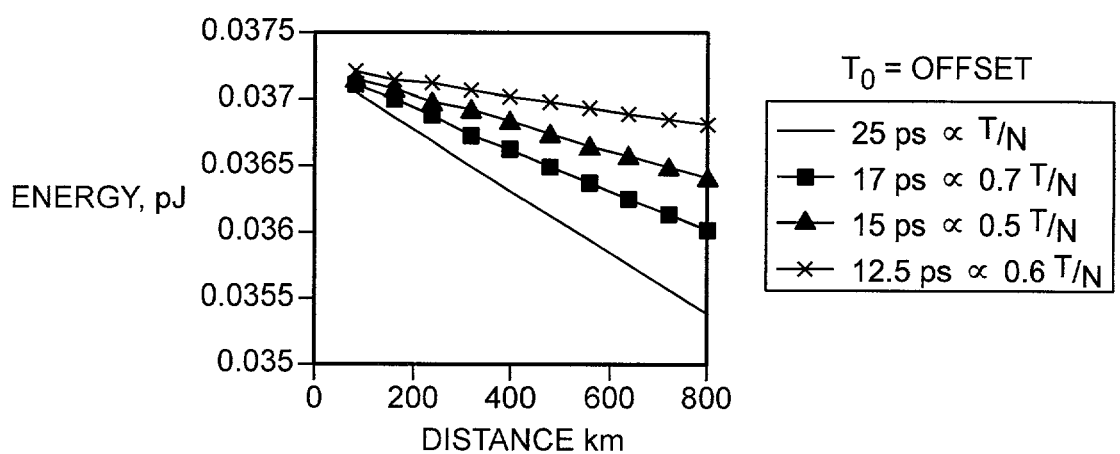
FIG. 11 is a detuning offset graph as a function of the depleted energy of a central pulse in the system 900, in accordance with the teachings of the present invention.

Referring to FIG. 11, the energy exchange among three pulses separated by the bit period $T_m$=25 ps or frame of the multiplexed data stream is analyzed. The energy decay of the central pulse for different positions of the left pulse is shown for the same example of FIG. 10. The depleted energy level over distance shows the interaction between three consecutive "1" in the N/T=40 Gb/s multiplexed system. The offset period $T_o$, as seen in FIG. 8, indicates the distance of the left pulse from the central pulse in a potential three sequential pulse multiplexed data stream. The bit slot timing interval T/N is 25 ps. If all the pulses are equally spaced (solid line), the nonlinear interaction is maximum and the energy of the central pulse is more depleted as compared to the case of unequally spaced pulses. As the energy of the central pulse is depleted, it gives rise to more penalty degrading the transmission performance. From FIG. 11, it appears that the more the offset from the center of the bit, the more improvement results. However, there is an upper limit for the offset due to the fact that the penalty due to the optical time division demultiplexer 300' increases with offset and if the offset is more than the half the bit slot timing interval, the penalty due to the optical time division demultiplexer 300' can undo the benefit obtained by suppressing the nonlinear interaction.

The numerical simulations from FIGS. 10 and 11 have thus shown that the optimal offset is about +/−30% of the bit period of the 40 Gb/s signal or 0.3 of the bit slot timing interval=0.3 T/N. Hence, to reduce the penalty due to demultiplexer switching window time, temporal detuning $\delta T$ should be smaller than half a bit slot timing interval. Preferably, the temporal detuning $\delta T$ should be 0.3 of the bit slot timing interval=0.3 T/N. However, depending on the actual short pulse widths used and other system parameters, the temporal detuning $\delta T$ of the short pulse in every third or fourth bit slot could be any fraction in a range between 0.2–0.5 of the bit slot timing interval=0.2–0.5 T/N.

As the "Four" in FWM is the same as N=4, as the name suggests, FWM is the interaction of four waves or four pulses. If the multiplexed signal has more than four pulses, for example, a short pulse sequence of 10 short pulses, several four wave mixing side pulse due to several triplets falling on a particular bit of interest will occur. If every third or fourth bits in their slots are unequally spaced as taught by the present invention, four wave mixing side pulses will not overlap at the center of the bit slot.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of suppressing intra-channel four wave mixing for improved transmission performance in a time division multiplexing system for transmitting a portion of N signals in the same bit period T of transmitting one signal, the method comprising the steps of:

converting N synchronous data streams, each having a reduced data pulse width within a bit slot timing interval T/N, from parallel to serial form, for bit interleaving the N synchronous data streams into the optical communication link at a nominal bit slot delay between sequential N synchronous data streams related to a multiple of the bit slot timing interval T/N to provide a frame of serial data sequence of short pulses having an equal bit slot delay between sequential pulses; and varying a sequential bit slot delay between two of the short optical pulses in the frame to provide an unequal bit slot delay between sequential pulses within the serial data sequence of short pulses to improve transmission performance by suppressing intra-channel four wave mixing.

2. The method of claim 1, wherein the varying step comprises the step of increasing a sequential bit slot delay between two of the optical pulses to delay a predetermined bit slot.

3. The method of claim 1, wherein the varying step comprises the step of decreasing a sequential bit slot delay between two of the short pulses to add a deterministic pulse position change to a nominally equal bit slot delay between sequential pulses of the serial data sequence of short pulses.

4. The method of claim 1, wherein the varying step comprises the step of detuning the position of a pulse in every third or fourth short bit slot of the frame of serial data sequence of short pulses.

5. The method of claim 1, wherein the varying step comprises the step delaying the short pulse in every third or fourth bit slot by a fraction in a range between 0.2–0.5 of the bit slot timing interval T/N.

6. An optical parallel-to-serial converter for converting N synchronous data streams, each having a bit period T, each having a nominal data pulse width T/2, from parallel to serial form for multiplexing a 1/T signal into an N/T multiplexed signal in an optical communication link, the converter comprising:

N compressed data encoders disposed in an optical communication link for providing N encoded data streams having the nominal data pulse width divided into N short pulse width by a timing signal having a bit slot timing interval T/N;

a combiner for bit interleaving the N encoded data streams into a serial data sequence of short pulses for multiplexing into the optical communication link;

N−1 delay elements coupled to each N−1 optical compressed data encoders, each delay element having a nominal delay related to the bit slot timing interval for ensuring nonoverlapping serial multiplexing of the short pulses into the optical communication link; and at least one intra-channel four-wave mixing eliminating delay element coupled to at least one of the N−1 delay elements for increasing a sequential bit delay between two of the short optical pulses to provide an unequal bit delay between sequential pulses within the serial data sequence of short pulses for suppression of undesired four-wave mixing pulses of the N synchronous data streams.

7. The converter of claim 6, wherein the N compressed data encoders comprise:

N modulators disposed in the optical communication link;

N bit compressors coupled to each respective one of the N modulators for applying one of the N synchronous data streams to each of the N modulators; and a synchronized timing signal providing a timing pulse with a bit slot timing interval which is not greater than the Nth fraction of the nominal data pulse width for clocking each of the N bit compressors for reducing the nominal data pulse width to the bit slot timing interval to provide N encoded data streams.

8. The converter of claim 6, wherein the N compressed data encoders comprise:

a compressed pulse source for providing a short pulse stream having a synchronized timing signal providing a timing pulse with the bit slot timing interval which is not greater than the Nth fraction of the nominal data pulse width for reducing the nominal data pulse width to the bit slot timing interval;

a splitter coupled to the compressed pulse source for splitting the short pulse stream into N short pulse streams; and N modulators disposed in the optical communication link and each N modulator coupled to the splitter for modulating each of the N short pulse streams by one of the N synchronous data streams to provide N encoded data streams.

9. The converter of claim 8, wherein the compressed pulse source comprises:

a laser pulse source for generating a 10 Gb/s return-to-zero (RZ) pulse train having a bit period of 100 ps for accommodating the nominal data RZ pulse width of 50 ps or less; and a bit compressor coupled to the laser pulse source for providing a short pulse optical stream at 10 Gb/s having a synchronized timing signal providing a timing pulse with the bit slot timing interval which is 25 ps for reducing the nominal data pulse width to a short pulse width of 12.5 ps or less for accommodating the short pulse and a returned to zero portion of the pulse within the bit slot timing interval.

10. The converter of claim 9, wherein the splitter comprises a power splitter coupled to the bit compressor for splitting the short pulse optical stream at 10 Gb/s into four short pulse optical streams at 10 Gb/s on four parallel optical communication link branches.

11. The converter of claim 10, wherein N modulators comprise four data modulators cascaded in each of the four parallel optical communication link branches and each of the four data modulator coupled to the splitter for modulating each of the four short pulse optical streams at 10 Gb/s by one of the four synchronous data streams to provide four encoded data streams at 10 Gb/s wherein a MARK pulse is represented by a non-zero level voltage for the duration of the short pulse width and an absence of a MARK pulse by the zero voltage over the entire bit slot timing interval.

12. The converter of claim 11, wherein the combiner comprises an optical time division multiplexer (OTDM) to multiplex the four encoded data streams at 10 Gb/s for bit interleaving into a serial data sequence of short optical pulses at 40 Gb/s for multiplexing into the optical communication link.

13. The converter of claim 12, wherein the N−1 delay elements comprise three delayed branches of the four parallel optical communication link branches having different fiber lengths at multiples of the nominal delay that is equal to the bit slot timing interval to delay the transmission of the center of the Mark pulse centered at the middle of the bit slot timing interval on the non-delayed link branch to 1 times the bit slot timing interval, synchronized from the beginning of the bit period on a first one of the three delayed branches, to 2 times the bit slot timing interval, synchronized from the beginning of the bit period on the second one of the three delayed branches, and to 3 times the bit slot timing interval, synchronized from the beginning of the bit period on the third one of the three delayed branches for ensuring non-overlapping serial multiplexing of the short optical pulses into the optical communication link.

14. The converter of claim 13, wherein the at least one intra-channel four-wave mixing eliminating delay element comprises an added fiber length coupled to one of the second or third one of the delayed branches, the added fiber length having the additional delay of 0.3 of the bit slot timing interval to delay the transmission of the center of the Mark pulse nominally centered at the middle of the bit slot timing interval on the second or third one of the delayed branches the additional 7.5 ps, synchronized from the beginning of the bit period for increasing the nominally equal spacing greater than or equal to 25 ps between two of the short optical pulses to provide the unequal bit delay between sequential pulses of 32.5 ps within the serial data sequence of short optical pulses for detuning the pulse position of every third or fourth short optical pulses of the serial data sequence of short optical pulses for suppression of side pulses due to resonant intra-channel four-wave-mixing.

15. An TDM system for optically time multiplexing N synchronous RZ data streams, each having a bit period of T and pulsing at a bit rate of 1/T into a frame of serial data sequence of short optical pulses operating at a baud rate of N/T for multiplexing into an optical communication link, the system comprising:

a laser pulse source for generating a return-to-zero (RZ) pulse train at the bit rate of 1/T and having the bit period of T for accommodating a nominal RZ pulse width of T/2 or less;

a bit compressor coupled to the laser pulse source for providing a short pulse optical stream pulsing at 1/T, the bit compressor having a synchronized timing signal providing a timing pulse with a bit slot timing interval T/N for reducing the nominal pulse width to a short pulse width less than or equal to 0.5 T/N for accommodating the short pulse and a returned to zero portion of the pulse within the bit slot timing interval;

a splitter coupled to the bit compressor for splitting the short pulse optical stream pulsing at 1/T into N short pulse optical streams pulsing at 1/T on N parallel optical communication link branches;

N data modulators cascaded in each of the N parallel optical communication link branches, each of the N data modulators coupled to the splitter for modulating each of the N short pulse optical streams pulsing at 1/T by one of the N synchronous data streams to provide N encoded data streams pulsing at 1/T wherein a MARK symbol is represented by a non-zero level voltage for the duration of the short pulse width and a zero voltage for the rest of the bit slot timing interval and an absence of a MARK symbol by the zero voltage over the entire bit slot timing interval;

a time division multiplexer (TDM) for bit interleaving the N encoded data streams pulsing at 1/T into the serial data sequence of short optical pulses operating at the bit rate of N/T for multiplexing into the optical communication link;

N−1 delayed branches of the N parallel optical communication link branches having different fiber lengths at multiples of a nominal delay that is equal to the bit slot timing interval to delay the transmission of the center of a Mark pulse nominally centered at the middle of the bit slot timing interval on a non-delayed link branch to 1 time the bit slot timing interval, synchronized from the beginning of the bit period on a first one of the N−1 delayed branches, to 2 times the bit slot timing interval, synchronized from the beginning of the bit period on a second one of the N−1 delayed branches, and so on, to 3 times the bit slot timing interval, synchronized from the beginning of the bit period on a N−1 last one of the N−1 delayed branches for ensuring nonoverlapping serial multiplexing of the short optical pulses into the optical communication link; and an added fiber length coupled to one of the second to last one or last one of the N−1 delayed branches, the added fiber length having an additional delay of 0.3 of the bit slot timing interval to delay the transmission of the center of a Mark pulse nominally centered at the middle of the bit slot timing interval on the second to last one or the last one of the delayed N−1 delayed branches the additional (0.3)T/N delay, synchronized from the beginning of the bit period for increasing a nominally equal spacing greater than or equal to T/N between two sequential bits of the short optical pulses to provide an unequal spacing between sequential pulses greater than or equal to 1.3 T/N referenced from the beginning of each sequential bits within the serial data sequence of short optical pulses for detuning the pulse position of every N−1 one or last Nth one of the short optical pulses of the serial data sequence of short optical pulses for suppression of side pulses due to resonant intra-channel four-wave-mixing.

16. The system of claim 15, wherein N=4, the bit period T=25 ps for optically time multiplexing 4 synchronous RZ data streams, each having the bit period of 25 ps and pulsing at the pulse rate of 40 Gb/s into the serial data sequence of short optical pulses operating at the bit rate of 160 Gb/s, the system comprising:

the laser pulse source for generating the 40 Gb/s return-to-zero (RZ) pulse train having the bit period of 25 ps for accommodating the nominal RZ pulse width of 12.5 ps;

the bit compressor coupled to the laser pulse source for providing the short pulse optical stream at 40 Gb/s having the synchronized timing signal providing the timing pulse with the bit slot timing interval which is 6.25 ps for reducing the nominal pulse width to the short pulse width of less than or equal to 3.125 ps for accommodating the short pulse and the returned to zero portion of the pulse within the bit slot timing interval;

the splitter coupled to the bit compressor for splitting the short pulse optical stream at 40 Gb/s into four short pulse optical streams at 40 Gb/s on four parallel optical communication link branches;

four data modulators cascaded in each of the four parallel optical communication link branches, each of the four data modulators coupled to the splitter for modulating each of the four short pulse optical streams at 40 Gb/s by one of four synchronous data streams to provide four encoded data streams at 40 Gb/s wherein the MARK pulse is represented by the non-zero level voltage over the short pulse width and the zero voltage over the rest of the bit slot timing interval and the absence of a MARK pulse by the zero voltage over the entire bit slot timing interval;

the optical time division multiplexer (OTDM) for multiplexing the four encoded data streams at 40 Gb/s for bit interleaving into the serial data sequence of short optical pulses at 160 Gb/s for multiplexing into the optical communication link;

three delayed branches of the four parallel optical communication link branches having different fiber lengths at multiples of the nominal delay that is equal to the bit slot timing interval 6.25 ps to delay the transmission of the center of the Mark pulse nominally centered at the middle of the bit slot timing interval on the non-delayed link branch to 1 times the bit slot timing interval, synchronized from the beginning of the bit period on the first one of the three delayed branches, to 2 times the bit slot timing interval, synchronized from the beginning of the bit period on the second one of the three delayed branches, and to 3 times the bit slot timing interval, synchronized from the beginning of the bit period on the third one of the three delayed branches for ensuring nonoverlapping serial multiplexing of the short optical pulses into the optical communication link; and the added fiber length coupled to one of the second or third one of the delayed branches, the added fiber length having the additional delay of 0.3 of the bit slot timing interval (6.25 ps) to delay the transmission of the center of the Mark pulse nominally centered at the middle of the bit slot timing interval on the second or third one of the delayed link branches the additional 1.875 ps, synchronized from the beginning of the bit period for increasing the nominally equal spacing greater than or equal to 6.25 ps between two sequential bits of the short optical pulses to provide the unequal spacing between sequential pulses greater than or equal to 8.125 ps within the serial data sequence of short optical pulses for detuning the pulse position of every third or fourth short optical pulses of the serial data sequence of short optical pulses for suppression of side pulses due to resonant intra-channel four-wave-mixing.

17. The system of claim 15, wherein N=4, the bit period T=100 ps for optically time multiplexing 4 synchronous RZ data streams, each having the bit period of 100 ps and pulsing at the bit rate of 10 Gb/s into the serial data sequence of short optical pulses operating at the baud rate of 40 Gb/s, the system comprising:

the laser pulse source for generating the 10 Gb/s return-to-zero (RZ) pulse train having the bit period of 100 ps for accommodating the nominal RZ pulse width of 50 ps;

the bit compressor coupled to the laser pulse source for providing the short pulse optical stream at 10 Gb/s having the synchronized timing signal providing the timing pulse with the bit slot timing interval which is 25 ps for reducing the nominal pulse width to the short pulse width less than or equal to 12.5 ps for accommodating the short pulse and the returned to zero portion of the pulse within the bit slot timing interval;

the splitter coupled to the bit compressor for splitting the short pulse optical stream at 10 Gb/s into four short pulse optical streams at 10 Gb/s on four parallel optical communication link branches;

four data modulators cascaded in each of the four parallel optical communication link branches, each of the four data modulators coupled to the splitter for modulating each of the four short pulse optical streams at 10 Gb/s by one of four synchronous data streams to provide four encoded data streams at 10 Gb/s wherein the MARK pulse is represented by a non-zero level voltage for the duration of the short pulse width and the zero voltage for the rest of the bit slot timing interval and the absence of the MARK pulse by the zero voltage over the entire bit slot timing interval;

the optical time division multiplexer (OTDM) for bit interleaving the four encoded data streams at 10 Gb/s into the serial data sequence of short optical pulses at 40 Gb/s for multiplexing into the optical communication link;

three delayed branches of the four parallel optical communication link branches having different fiber lengths at multiples of the nominal delay that is equal to the bit slot timing interval 25 ps to delay the transmission of the center of the Mark pulse centered at the middle of the bit slot timing interval on the non-delayed link branch to 1 times the bit slot timing interval, synchronized from the beginning of the bit period on a first one of the three delayed branches, to 2 times the bit slot timing interval, synchronized from the beginning of the bit period on the second one of the three delayed branches, and to 3 times the bit slot timing interval, synchronized from the beginning of the bit period on the third one of the three delayed branches for ensuring nonoverlapping serial multiplexing of the short optical pulses into the optical communication link; and the added fiber length coupled to one of the second or third one of the delayed branches, the added fiber length having the additional delay of 0.3 of the bit slot timing interval (25 ps) to delay the transmission of the center of the Mark pulse nominally centered at the middle of the bit slot timing interval on the second or third one of the delayed branches the additional 7.5 ps, synchronized from the beginning of the bit period for increasing the nominally equal spacing greater than or equal to 25 ps between two of the short optical pulses to provide the unequal bit delay between sequential pulses of 32.5 ps within the serial data sequence of short optical pulses for detuning the position of a pulse in every third or fourth bit slot of the frame of serial data sequence of short optical pulses for suppression of side pulses due to resonant intra-channel four-wave-mixing.

18. The system of claim 17, wherein the system comprises an OTDM transmitter for use as a single WDM channel RZ transmitter having at least a bit rate of 40 Gb/s in a set of similarly multiplexed single WDM channel RZ transmitters in a Wavelength Division Multiplexed (WDM) system with a bitrate/channel greater than or equal to 40 Gb/s.

19. The system of claim 17, wherein the system comprises an OTDM receiver for use as a single WDM channel RZ receiver having at least a bit rate of 40 Gb/s in a set of similarly multiplexed single WDM channel RZ receivers in a Wavelength Division Multiplexed (WDM) system with a bitrate/channel greater than or equal to 40 Gb/s for reversing the operation from multiplexing to demultiplexing.

20. The system of claim 17, wherein the added length comprises a section of dispersion managed fiber.

* * * * *